(No Model.)

W. J. CASHEN.
CAKE PAN FRAME.

No. 252,428. Patented Jan. 17, 1882.

WITNESSES:
C. Neveux
C. Sedgwick

INVENTOR:
W. J. Cashen
BY
ATTORNEYS.

1
UNITED STATES PATENT OFFICE.

WILLIAM J. CASHEN, OF PORTLAND, CONNECTICUT.

CAKE-PAN FRAME.

SPECIFICATION forming part of Letters Patent No. 252,428, dated January 17, 1882.

Application filed October 14, 1881. (No model.)

*To all whom it may concern:*

Be it known that I, WILLIAM J. CASHEN, of Portland, in the county of Middlesex and State of Connecticut, have invented a new Improvement in Cake-Pan Frames, of which the following is a full, clear, and exact specification.

Reference is to be had to the accompanying drawings, forming part of this specification, in which similar letters of reference indicate corresponding parts in all the figures.

Figure 1:
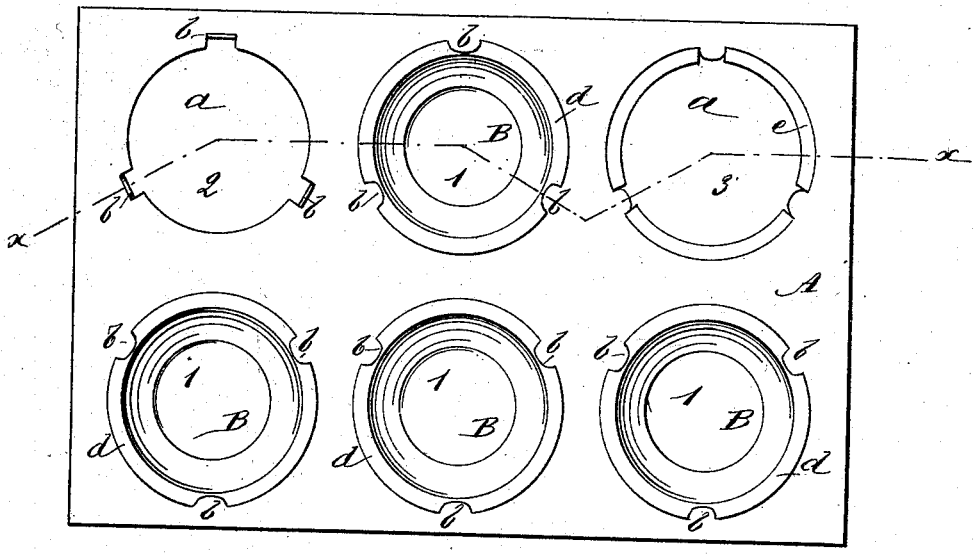
Figure 2:
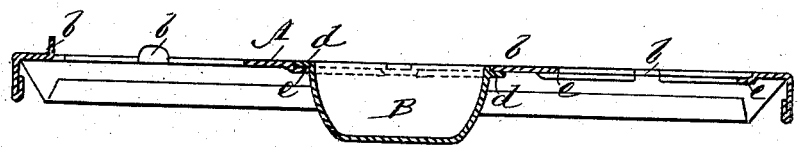
Figure 3:
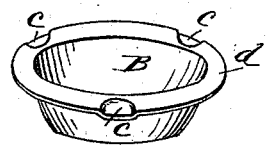

Figure 1 is a plan view of the frame, showing the same at 1 as it appears when the pans are secured in place, at 2 as it appears just previous to receiving the pan, and at 3 as it would appear if the pan were removed after being secured in place. Fig. 2 is a cross-sectional elevation taken on the line $x\,x$ of Fig. 1, and Fig. 3 is a perspective view of one of the pans.

The frame A is first formed by placing a sheet of metal in a suitable die, arranged for cutting as many holes $a\,a$ as there are to be pans B put in the frame. At the same time these holes are cut in the frame, and by the same die the lips $b\,b$ (as many as desired for firmly holding each of the pans) are cut and turned up, as shown at 2, Fig. 1. The pans B are then stamped or swaged by means of a suitable die and mandrel in the ordinary manner, and they may or may not be formed with the indentations $c\,c$ in the rim $d$. The pans are then placed in the holes previously made in the frame, and the whole is then placed in a die and the plunger or mandrel of the die is brought down upon the frame and pans, which simultaneously closes down the whole series of lips over the edges of the pans and at the same time forces the rim $d$ of the pans down, forming the countersinks $e$ in the frame, so that the rims or upper edges of the pans will stand flush with the upper surface of the frame.

Though the pans may be made in the ordinary way without the indentations $c$, as above intimated, I prefer to make them with these indentations, so that when the lips are bent over the edges of the pans they also will be flush with the upper surface of the frame and the rims of the pans, as shown clearly in Fig. 2; and though it is preferable to make the indentations $c$ at the time the pan is stamped, it will be understood that instead of this the uniting-die may be made with suitable recesses where the rims of the pans come, to permit the lips to be compressed into the rims of the pans by the force of the mandrel, in the same manner as the rims of the pans are compressed into the frame at the edges of the holes, as above described.

By this method it will be seen that the frame is formed and the whole number of completed pans secured in the frame by two simple operations. After the pans and frame (now a single utensil) have been taken from the uniting press or die the whole may be retinned to make a better finish at the joints of the pans and frame, if desired.

Having thus described my invention, I claim as new and desire to secure by Letters Patent—

1. The pan B, formed with the indentation, $c$, in combination with the frame A, formed with the lips $b$, substantially as described.

2. The pan B, formed with the rim $d$ and indentations $c$, in combination with the frame A, formed with the lips $b$, and the annular depression $e$, substantially as described.

WILLIAM J. CASHEN. [L. S.]

Witnesses:
KATIE McQUILLIN,
ARCH McKINLAY.